United States Patent
Hata (10) Patent No.: US 12,030,902 B2
(45) Date of Patent: *Jul. 9, 2024

(54) POLYMER CROSSLINKING AGENT, AND HIGH MOLECULAR WEIGHT POLYMER AND COMPOSITION USING SAME

(71) Applicant: SHIN-ETSU CHEMICAL CO., LTD., Tokyo (JP)

(72) Inventor: Ryunosuke Hata, Takasaki (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 980 days.

This patent is subject to a terminal disclaimer.

(21) Appl. No.: 16/928,057

(22) Filed: Jul. 14, 2020

(65) Prior Publication Data

US 2021/0017199 A1    Jan. 21, 2021

(30) Foreign Application Priority Data

Jul. 16, 2019 (JP) ................. 2019-130815

(51) Int. Cl.
| | |
|---|---|
| C07F 7/08 | (2006.01) |
| C08G 77/38 | (2006.01) |
| C08K 3/34 | (2006.01) |
| C08K 5/01 | (2006.01) |
| C08K 5/10 | (2006.01) |

(52) U.S. Cl.
CPC ............ *C07F 7/0834* (2013.01); *C08G 77/38* (2013.01); *C08K 3/34* (2013.01); *C08K 5/01* (2013.01); *C08K 5/10* (2013.01)

(58) Field of Classification Search
CPC ......... C07F 7/0834; C08G 77/38; C08K 3/34; C08K 5/01; C08K 5/10
See application file for complete search history.

(56) References Cited

U.S. PATENT DOCUMENTS

| | | |
|---|---|---|
| 5,236,986 A | 8/1993 | Sakuta |
| 5,719,230 A | 2/1998 | Ando et al. |
| 2006/0034875 A1 | 2/2006 | Nakanishi et al. |
| 2016/0194426 A1 | 7/2016 | Yoo et al. |
| 2017/0233514 A1* | 8/2017 | Yamamoto ............. B32B 7/06 523/435 |

FOREIGN PATENT DOCUMENTS

| | | |
|---|---|---|
| CN | 107075341 A | 8/2017 |
| EP | 3 208 322 A1 | 8/2017 |
| JP | H01-207354 A | 8/1989 |
| JP | H04-045114 A | 2/1992 |
| JP | H04-272932 A | 9/1992 |
| JP | H08-209037 A | 8/1996 |
| JP | H10-310677 A | 11/1998 |
| JP | 2006-083299 A | 3/2006 |
| JP | 2012-072081 A | 4/2012 |
| WO | 2004/024798 A1 | 3/2004 |
| WO | 2016/060084 A1 | 4/2016 |

OTHER PUBLICATIONS

Nov. 19, 2020 Extended European Search Report issued in European Patent Application No. 20185993.1.
Dec. 20, 2022 Office Action issued in Chinese Patent Application No. 202010680074.X.
Nov. 8, 2021 European Office Action issued in European Patent Application No. 20185993.1.
Apr. 26, 2022 Notification of Reasons for Refusal issued in Japanese Patent Application No. 2019-130815.
Jun. 23, 2022 Office Action issued in European Patent Application No. 20185993.1.

* cited by examiner

*Primary Examiner* — Jane L Stanley
(74) *Attorney, Agent, or Firm* — Oliff PLC (57) ABSTRACT

This is to provide a polymer crosslinking agent which is capable of improving affinity for ester oil.

The polymer crosslinking agent is a (meth)acrylic-based graft silicone which comprises (meth)acryl-based repeating units represented by the following formulae (I), (II) and (III) as a main chain, and an unsaturated bond(s) and an organopolysiloxane structure at the side chain. Also, the high molecular weight polymer is an addition polymerization product of the polymer crosslinking agent and an organohydrogen polymer, and a composition is a material in which the high molecular weight polymer is swollen by a liquid oil agent.

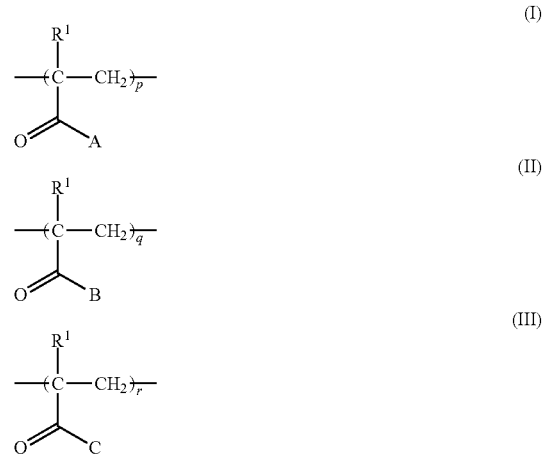

10 Claims, 2 Drawing Sheets

POLYMER CROSSLINKING AGENT, AND HIGH MOLECULAR WEIGHT POLYMER AND COMPOSITION USING SAME

TECHNICAL FIELD

The present invention relates to a novel polymer crosslinking agent, and a high molecular weight polymer and a composition using the same.

BACKGROUND ART

It has been disclosed in Patent Document 1 that a specific organopolysiloxane polymerized product obtained by subjecting an organohydrogen polysiloxane and an organopolysiloxane having at least two aliphatic unsaturated bonding groups to addition polymerization can be a base material for cosmetics soft and excellent in stability, and it has been used in many cosmetics.

On the other hand, it has conventionally and widely been carried out to use liquid oil such as silicone oil, hydrocarbon oil, ester oil, natural animal or vegetable oil, and semi-synthetic oil by thickening and making a paste state in the fields of medical, cosmetics, etc. In particular, the ester oil is an oil agent which can obtain various feelings by controlling a structure at an alcohol portion and a structure at an aliphatic acid portion, and is frequently used as a material for cosmetics.

In Patent Documents 2 and 3, it has been disclosed that an organopolysiloxane polymerized product modified by a long-chain alkyl group, a polyether chain or a polyglycerin chain, and a paste-state silicone composition in which silicone oil is added to swell the polymerized product provide cosmetics excellent in storage stability. However, since the organopolysiloxane polymerized product is hydrophobic, it is difficult to be swollen with ester oil having high polarity, and the polymerized products disclosed in Patent Document 2 and 3 can be swollen with ester oil, but affinity for the ester oil is insufficient so that there are some cases of becoming turbid. Also, depending on the structure of the ester oil, there is a material which cannot be swollen, so that there is room for improvement in affinity for the ester oil.

CITATION LIST

Patent Literature

Patent Document 1: JP Hei.1-207354A
Patent Document 2: JP Hei.4-272932A
Patent Document 3: WO 2004/024798

SUMMARY OF INVENTION

Technical Problem

To present invention has been accomplished in view of the above-mentioned circumstance, and an object thereof is to provide a polymer crosslinking agent capable of improving affinity for ester oil. Further, an object thereof is to provide a high molecular weight polymer improved in affinity for ester oil by subjecting to addition polymerization of the above-mentioned polymer crosslinking agent and an organohydrogen polysiloxane, and a composition comprising the high molecular weight polymer which is being swollen by containing a liquid oil agent.

Solution to Problem

In the present invention, a polymer crosslinking agent which comprises a (meth)acrylic-based graft silicone which contains a main chain having (meth)acrylic-based repeating units represented by the following formulae (I), (II) and (III), and a side chain having an unsaturated bond(s) and an organopolysiloxane structure is provided.

[wherein, $R^1$s each independently represent a hydrogen atom or a methyl group, A represents an alkoxy group having 1 to 22 carbon atoms, an aryloxy group having 6 to 20 carbon atoms, a substituted or unsubstituted monovalent hydrocarbon group having 1 to 20 carbon atoms which may contain one or more kinds selected from —O—, —S— and —NR— (R represents a hydrogen atom or a monovalent hydrocarbon group having 1 to 20 carbon atoms) (provided that the oxygen atom, the sulfur atom and the nitrogen atom are not adjacent to each other), an amino group, a dialkylsiloxy group, a halogen atom or a hydroxyl group. B represents a group having an unsaturated bond represented by the following formula (1):

(wherein, $R^2$ represents a single bond or a substituted or unsubstituted divalent hydrocarbon group having 1 to 20 carbon atoms which may contain one or more kinds selected from —O—, —S— and —NR— (R is as defined above) (provided that the oxygen atom, the sulfur atom and the nitrogen atom are not adjacent to each other)). "C" represents either of a group having a linear organopolysiloxane structure represented by the following formula (2), or a group having a dendritic organopolysiloxane structure represented by the following formula (3-1) or (3-2):

(in the formula (2), $Z_1$ represents a divalent organic group, $R^3$s each independently represents a saturated hydrocarbon group having 1 to 10 carbon atoms or a phenyl group, $R^4$ represents a saturated hydrocarbon group having 1 to 10 carbon atoms, and "m" is an integer of 0 to 100)

(3-1)

(3-2)

(in the formulae (3-1) and (3-2), $Z_2$ represents a divalent organic group, "a" is a number of 0 to 3, Q represents a group represented by the following formula (3), D represents an organopolysiloxanyl group having a dendritic structure with a hierarchical number of "c" and a valence of $3^c+1$ (that is, "3 to the $c^{th}$ power"+1), "c" is an integer of 1 to 8, (3)

$R^5$ represents a saturated hydrocarbon group having 1 to 10 carbon atoms or a phenyl group. $R^6$ represents a saturated hydrocarbon group having 1 to 8 carbon atoms or a phenyl group, $R^7$ represents a hydrogen atom, a saturated hydrocarbon group having 1 to 10 carbon atoms or a phenyl group, "$a^2$" is a real number of 0 to 2, and "n" is an integer of 2 to 12) an order of bonding of the repeating units represented by the above-mentioned formulae (I), (II) and (III) is not limited, "p", "q" and "r" are integers, "q" and "r" are not 0, and are numbers in which a number average molecular weight of the above-mentioned polymer crosslinking agent becomes 1,000 to 1,000,000 g/mol.]

This polymer crosslinking agent has many ester bondings, so that it is dissolved well in ester oil.

B in the above-mentioned formula (II) is preferably at least one kind of a functional group selected from an allyloxy group and a 2-allyloxyethoxy group.

When B in the above-mentioned formula (II) is the above-mentioned specific functional group, a reaction rate at the time of synthesizing the (meth)acrylic-based graft silicone constituting the polymer crosslinking agent by addition polymerization becomes fast.

Also, in the present invention, a high molecular weight polymer which is an addition polymerization product of the above-mentioned polymer crosslinking agent and an organohydrogen polysiloxane represented by the following general formula (4) is provided.

$$M_xD_yT_zQ_w \quad (4)$$

$M=R^8{}_3SiO_{1/2}$
$D=R^9{}_2SiO_{2/2}$
$T=R^9SiO_{3/2}$
$Q=SiO_{4/2}$ ($R^8$ and $R^9$ each independently represent a hydrogen atom, a substituted or unsubstituted alkyl group having 1 to 10 carbon atoms or an aryl group having 6 to 22 carbon atoms, and at least two siloxane units contain hydrogen atoms. "x", "y", "z" and "w" each are 0 or a positive number, provided that y+z+w≥1, and a number in which a number average molecular weight of the organohydrogen polysiloxane represented by the above-mentioned general formula (4) becomes 500 to 900,000 g/mol. An order of bonding of the respective siloxane units represented by the above-mentioned M, D, T and Q is not limited.)

This high molecular weight polymer has high affinity for ester oil, and provides a composition which is stable and has high transparency.

This high molecular weight polymer is preferably a material which can swell by containing liquid oil with the same mass or more as its own mass.

When this high molecular weight polymer is a material which can swell by containing liquid oil with the same mass or more as its own mass, it becomes a material providing a composition which has higher affinity for liquid oil, is more stable and has high transparency.

In the above-mentioned organohydrogen polysiloxane, it is preferable that $R^9$ is a methyl group or a phenyl group, and "z" and "w" are 0.

When the above-mentioned organohydrogen polysiloxane has the above-mentioned specific functional group, and is a material comprising an M unit and a D unit, a high molecular weight polymer becomes a linear material with less branching, and a more uniform material can be obtained when it is reacted with the above-mentioned polymer crosslinking agent.

Further, in the present invention, a composition in which the above-mentioned high molecular weight polymer is swollen by a liquid oil agent is provided.

This composition is a material which is stable and has high transparency.

The above-mentioned liquid oil agent is preferably at least one kind of an oil agent selected from the group consisting of silicone oil, hydrocarbon oil, ester oil, natural animal or vegetable oil, and semi-synthetic oil.

This composition is a material being swollen by the above-mentioned various kinds of oil agents.

Advantageous Effects of Invention

The polymer crosslinking agent of the present invention has many ester bonds so that it is well dissolved in ester oil. Further, the high molecular weight polymer in which this polymer crosslinking agent and an organohydrogen polysiloxane are subjected to addition polymerization can produce a composition having high affinity for ester oil, and being stable and high transparency.

DESCRIPTION OF EMBODIMENTS

As mentioned above, it has been desired to develop a polymer crosslinking agent which can improve affinity for ester oil.

The present inventor has repeated ingenuity, and as a result, he has found that a high molecular weight polymer in which a graft polymer which has a main chain having a (meth)acryl group and a side chain having an unsaturated bond and an organopolysiloxane structure is subjected to addition polymerization with an organohydrogen polysiloxane as a polymer crosslinking agent is improved in affinity for ester oil, whereby the present invention has accomplished.

That is, the present invention is directed to a polymer crosslinking agent which comprises a (meth)acrylic-based graft silicone which has a main chain having (meth)acrylic-based repeating units represented by the following formulae (I), (II) and (III), and a side chain having an unsaturated bond and an organopolysiloxane structure.

(I)

(II)

(III)

[wherein, $R^1$s each independently represent a hydrogen atom or a methyl group, A represents an alkoxy group having 1 to 22 carbon atoms, an aryloxy group having 6 to 20 carbon atoms, a substituted or unsubstituted monovalent hydrocarbon group having 1 to 20 carbon atoms which may contain one or more kinds selected from —O—, —S— and —NR— (R represents a hydrogen atom or a monovalent hydrocarbon group having 1 to 20 carbon atoms) (provided that the oxygen atom, the sulfur atom and the nitrogen atom are not adjacent to each other), an amino group, a dialkylsiloxy group, a halogen atom or a hydroxyl group. B represents a group having an unsaturated bond represented by the following formula (1):

(1)

(wherein, $R^2$ represents a single bond or a substituted or unsubstituted divalent hydrocarbon group having 1 to 20 carbon atoms which may contain one or more kinds selected from —O—, —S— and —NR— (R is as defined above) (provided that the oxygen atom, the sulfur atom and the nitrogen atom are not adjacent to each other)). "C" represents any of a group having a linear organopolysiloxane structure represented by the following formula (2), or a group having a dendritic organopolysiloxane structure represented by the following formula (3-1) or (3-2).

(2)

(in the formula (2), $Z_1$ represents a divalent organic group, $R^3$s each independently represents a saturated hydrocarbon group having 1 to 10 carbon atoms or a phenyl group, $R^4$ represents a saturated hydrocarbon group having 1 to 10 carbon atoms, and "m" is an integer of 0 to 100)

(3-1)

(3-2)

(in the formulae (3-1) and (3-2), $Z_2$ represents a divalent organic group, "a" is a number of 0 to 3, Q represents a group represented by the following formula (3), D is a $3^c+1$ (that is, "3 to the $c^{th}$ power"+1) valence organopolysiloxanyl group having a dendritic structure with a hierarchical number of "c", "c" is an integer of 1 to 8,

Q:

(3)

$R^5$ represents a saturated hydrocarbon group having 1 to 10 carbon atoms or a phenyl group. $R^6$ represents a saturated hydrocarbon group having 1 to 8 carbon atoms or a phenyl group, $R^7$ represents a hydrogen atom, a saturated hydrocarbon group having 1 to 10 carbon atoms or a phenyl group, $a^2$ is a real number of 0 to 2, and "n" is an integer of 2 to 12) an order of bonding of the repeating units represented by the above-mentioned formulae (I), (II) and (III) is not limited, "p", "q" and "r" are integers, "q" and "r" are not 0, and are numbers in which the number average molecular weight of the above-mentioned polymer crosslinking agent becomes 1,000 to 1,000,000 g/mol.

Hereinafter, the present invention will be described in detail, but the present invention is not limited thereto. Also, the term "(meth)acryl" used in the following description refers to methacryl and acryl. The same is also applied to the term "(meth)acrylate", and this similarly refer to methacrylate and acrylate.

In the present invention, the number average molecular weight refers to a number average molecular weight measured by gel permeation chromatography (GPC) under the following conditions using polystyrene as a standard substance.

[Measurement Conditions]
Developing solvent: tetrahydrofuran (THF)
Flow amount: 0.6 mL/min
Detector: Differential refractive index detector (RI)
Column: TSK Guard column SuperH-L
  TSKgel SuperH4000 (6.0 mm I.D.×15 cm×1)
  TSKgel SuperH3000 (6.0 mm I.D.×15 cm×1)
  TSKgel SuperH2000 (6.0 mm I.D.×15 cm×2)
  (each available from Tosoh Corporation)
Column temperature: 40° C.
Sample injection amount: 50 µL (THF solution with a concentration of 0.5% by mass)

The polymer crosslinking agent of the present invention has repeating units represented by the following formulae (I), (II) and (III), and has an unsaturated bond(s) at the side chain. In this polymer crosslinking agent, an ester bond is contained in each of the repeating units, so that it has high affinity for ester oil. Therefore, a high molecular weight polymer synthesized by using the polymer crosslinking agent is improved in affinity for ester oil.

(I)

(II)

(III)

wherein, $R^1$s each independently represent a hydrogen atom or a methyl group. A represents an alkoxy group having 1 to 22 carbon atoms, an aryloxy group having 6 to 20 carbon atoms, a substituted or unsubstituted monovalent hydrocarbon group having 1 to 20 carbon atoms which may contain one or more kinds selected from —O—, —S— and —NR— (R represents a hydrogen atom or a monovalent hydrocarbon group having 1 to 20 carbon atoms) (provided that the oxygen atom, the sulfur atom and the nitrogen atom are not adjacent to each other), an amino group, a siloxy group, a halogen atom or a hydroxyl group, and from the viewpoint of affinity for ester oil, it is preferably an alkoxy group having 1 to 20 carbon atoms, and more preferably an alkoxy group having 4 to 18 carbon atoms.

B represents a group having an unsaturated bond represented by the following formula (1), and from the viewpoint of a reaction rate of the addition polymerization, it is preferably an allyloxy group and a 2-allyloxyethoxy group, and more preferably a 2-allyloxyethoxy group.

(1)

In the formula, $R^2$ represents a single bond or a substituted or unsubstituted divalent hydrocarbon group having 1 to 20 carbon atoms which may contain one or more kinds selected from —O—, —S— and —NR— (R represents a hydrogen atom or a monovalent hydrocarbon group having 1 to 20 carbon atoms) (provided that the oxygen atom, the sulfur atom and the nitrogen atom are not adjacent to each other).

"C" represents a group having a linear organopolysiloxane structure represented by the following formula (2), or a group having a dendritic organopolysiloxane structure represented by the following formula (3-1) or (3-2).

(2)

In the formula (2), $Z_1$ represents a divalent organic group, $R^3$s each independently represents a saturated hydrocarbon group having 1 to 10 carbon atoms or a phenyl group, $R^4$ represents a saturated hydrocarbon group having 1 to 10 carbon atoms, and "m" is an integer of 0 to 100.

(3-1)

(3-2)

In the formulae (3-1) and (3-2), $Z_2$ represents a divalent organic group, "a" is a number of 0 to 3, Q represents a group represented by the following formula (3), D represents a $3^c+1$ (that is, "3 to the $c^{th}$ power"+1) valence organopolysiloxanyl group having a dendritic structure with a hierarchical number of "c", "c" is an integer of 1 to 8,

Q:

(3)

$R^5$ represents a saturated hydrocarbon group having 1 to 10 carbon atoms or a phenyl group, $R^6$ represents a saturated hydrocarbon group having 1 to 8 carbon atoms or a phenyl group, $R^7$ represents a hydrogen atom, a saturated hydrocarbon group having 1 to 10 carbon atoms or a phenyl group, "$a^2$" is a real number of 0 to 2, and "n" is an integer of 2 to 12.

In the above-mentioned formula (2), $Z_1$ represents a divalent organic group, preferably a divalent saturated hydrocarbon group having 2 to 12 carbon atoms, and more preferably a propylene group. $R^3$ represents a saturated hydrocarbon group having 1 to 10 carbon atoms or a phenyl group, preferably a saturated hydrocarbon group having 1 to 5 carbon atoms, and more preferably a methyl group. $R^4$ represents a saturated hydrocarbon group having 1 to 10 carbon atoms, preferably a saturated hydrocarbon group having 1 to 5 carbon atoms, and more preferably a methyl group. "m" is an integer of 0 to 100, preferably an integer of 1 to 60, and more preferably an integer of 5 to 30.

In the above-mentioned formula (3-1) and (3-2), $R^3$ represents a saturated hydrocarbon group having 1 to 10 carbon atoms or a phenyl group, preferably a saturated hydrocarbon group having 1 to 5 carbon atoms, and more preferably a methyl group. $R^6$ represents a saturated hydrocarbon group having 1 to 8 carbon atoms or a phenyl group, preferably a saturated hydrocarbon group having 1 to 3 carbon atoms, and more preferably a methyl group. $Z_2$ represents a divalent organic group, preferably a saturated hydrocarbon group having 1 to 10 carbon atoms, more preferably a saturated hydrocarbon group having 1 to 5 carbon atoms. D represents a $3^c+1$ (that is, "3 to the $c^{th}$ power"+1) valence organopolysiloxanyl group having a dendritic structure with a hierarchical number of "c", "c" is an integer of 1 to 8, preferably an integer of 1 to 4, and more preferably an integer of 1 to 2.

The group represented by the above-mentioned formula (3-1) or (3-2) is, in detail, represented by the following structural formula.

In the above-mentioned formula (3-2'), D is represented by, for example, the following structural formula.

When a Hierarchical Number of (c) of D is 1

When a Hierarchical Number of (c) of D is 2

When a Hierarchical Number of (c) of D is 3

As the group represented by "C" in the formula (III), for example, there may be mentioned those represented by the following structural formulae.

Structure in which a Hierarchical Number of D is 1

Structure in which a Hierarchical Number of D is 2

An order of bonding of the repeating units represented by the above-mentioned formulae (I), (II) and (III) is not limited, and an arrangement constituted by the respective repeating units may be irregular, or may be regular. The repeating units (I), (II) and (III) may each be constituted by at least one kind, or may be constituted by a plural number thereof. In the above-mentioned formula, "p", "q" and "r" are integers, "q" and "r" are not 0, preferably "q" is 2 or more, more preferably 2 to 10, preferably "r" is 1 or more, and more preferably 1 to 20. A number average molecular weight of the polymer crosslinking agent is preferably 1,000 to 1,000,000 g/mol, more preferably 3,000 to 100,000 g/mol, and further preferably 5,000 to 50,000 g/mol.

Hereinafter, a polymerization method of the polymer crosslinking agent of the present invention will be described in detail. The polymerization method of the polymer crosslinking agent of the present invention is not particularly limited and, for example, can be obtained by subjecting to group transfer polymerization of monomers represented by the following general formulae (5), (6) and (7).

(5)

(6)

(7)

(wherein, $R^1$, A, B and C are as defined above.)

As the compound represented by the above-mentioned general formula (5), for example, the following compounds may be mentioned, but it is not limited to these.

Methyl (meth)acrylate, ethyl (meth)acrylate, n-butyl (meth)acrylate, tert-butyl (meth)acrylate, n-hexyl (meth)acrylate, isobutyl (meth)acrylate, isopentyl (meth)acrylate, lauryl(meth)acrylate, 2-ethylhexyl (meth)acrylate, stearyl (meth)acrylate, cyclohexyl (meth)acrylate, behenyl (meth)acrylate, isodecyl (meth)acrylate, 2-propylheptyl (meth)acrylate, 3,5,5-trimethyl-1-hexyl (meth)acrylate, nonanyl (meth)acrylate, 2-propylheptyl (meth)acrylate, 2-isopropyl-5-methylhexyl (meth)acrylate, tridecyl (meth)acrylate, heptadecyl (meth)acrylate, heneicosanyl (meth)acrylate, isobornyl (meth)acrylate, tetrahydrofurfuryl (meth)acrylate, di(ethylene glycol)dimethyl ether (meth)acrylate, furfuryl (meth)acrylate, 2-butoxyethyl(meth)acrylate, 2-ethoxyethyl (meth)acrylate, 1-ethoxybutyl (meth)acrylate, tetrahydro-4H-pyranyl-2-(meth)acrylate, ethyltriglycol (meth)acrylate, butyldiglycol (meth)acrylate, poly(propylene glycol)dimethyl ether (meth)acrylate and poly(ethylene glycol)alkyl ether (meth)acrylate, (meth)acrylamide, 4-(meth)acryloylmorpholine, N-tert-butyl (meth)acrylamide, N,N-dimethyl (meth)acrylamide, N,N-diethyl (meth)acrylamide, N-(butoxymethyl) (meth)acrylamide, N-[3-(dimethylamino)propyl](meth)acrylamide, N-dodecyl (meth)acrylamide and N-isopropyl (meth)acrylamide.

As the compound represented by the above-mentioned general formula (6), for example, the following compounds may be mentioned, but it is not limited to these.

Vinyl (meth)acrylate, allyl (meth)acrylate and 2-allyloxyethyl (meth)acrylate.

As the compound represented by the above-mentioned general formula (7), for example, the following compounds may be mentioned, but it is not limited to these.

-continued

Hereinafter, a producing method by the group transfer polymerization is exemplified, but as the producing method, other polymerization methods may be used, and it is not limited to the following method.

In a three-necked flask sufficiently dried is charged a catalyst and a solvent is added thereto. Further, an initiator is added thereto and after mixing the mixture, monomers (5), (6) and (7) are added dropwise to the mixture using a dropping funnel and the resulting mixture is stirred. The reaction solution is cooled depending on the degree of heat generation and maintained at an appropriate temperature. After the dropwise addition, stirring is continued until the monomers are consumed, and a reaction terminator is added thereto to complete the reaction. After the reaction, washing with water is carried out, if necessary, and the solvent is distilled off under reduced pressure.

An order of adding a catalyst, a solvent, an initiator and a monomer(s) of the group transfer polymerization can be selected from an appropriate order depending on the cases. For example, the reaction may be carried out by previously mixing monomers (5), (6) and (7), a solvent and an initiator, and finally adding a catalyst to the solution.

When all the monomers used for the reaction are previously mixed and added dropwise, a random copolymer can be synthesized. Also, when each monomer used for the reaction is alternately added, a block copolymer can be synthesized.

As an initiator, the following compounds can be used, but the initiators which can be used in the present invention are not limited to the initiators exemplified below.

(wherein, Me represents a methyl group, Et an ethyl group, nPr an n-propyl group, iPr an isopropyl group, and nBu an n-butyl group.)

As a reaction solvent, an aprotonic organic solvent may be used. For example, there may be mentioned ethyl acetate, propionitrile, toluene, xylene, bromobenzene, dimethoxyethane, diethoxyethane, diethyl ether, tetramethylenesulfone, N,N-dimethylformamide, N,N-dimethylacetamide, N-methylpyrrolidone, anisole, 2-butoxyethoxytrimethylsilane, cellosolve acetate, crown ether, acetonitrile and tetrahydrofuran (THF). From the viewpoint of reaction efficiency, it is preferably dichloromethane, toluene, acetonitrile and tetrahydrofuran, and more preferably tetrahydrofuran.

A reaction temperature is −100° C. to 150° C., preferably 0° C. to 50° C., and more preferably 10° C. to 30° C.

A temperature at the time of distillation under reduced pressure is 80° C. to 300° C., preferably 100° C. to 200° C., and more preferably 120° C. to 180° C. In addition, a pressure at that time is 1 atm or less, preferably 0.1 atm or less, and more preferably 0.001 atm or less.

As the catalyst, it can be used by selected from among an anionic catalyst, a Lewis acid catalyst and an organocatalyst which have been generally known as a catalyst for the group transfer polymerization.

Anionic Catalyst

For example, there may be mentioned tris(dimethylamino)sulfonium difluorotrimethylsilicate, tris(dimethylamino)sulfonium cyanide, tetraphenylarsonium cyanide, tris(dimethylamino)sulfonium azide, tetraethylammonium azide, bis(dialkylaluminum) oxide, boron trifluoride etherate, alkali metal fluoride, alkali metal cyanide, alkali metal azide, tris(dimethylamino)sulfonium difluorotriphenyl stannate, tetrabutylammonium fluoride, tetramethylammonium fluoride, tetraethylammonium cyanide, tetrabutylammonium benzoate, tetrabutylammonium bibenzoate and tetrabutylammonium m-chlorobenzoate.

Lewis Acid Catalyst

For example, there may be mentioned zinc iodide, zinc bromide, zinc chloride, mono- and dialkylaluminum halide and dialkylaluminum oxide.

Organocatalyst

For example, there may be mentioned 1,3-diisopropyl-4,5-dimethylimidazol-2-ylidene, 1,3-diisopropylimidazol-2-ylidene, 1,3-di-tert-butylimidazol-2-ylidene, 1,8-diazabicyclo[5.4.0]-7-undecene, 2,8,9-trimethyl-2,5,8,9-tetraaza-1-phosphabicyclo[3.3.3]undecane, 2,8,9-triisobutyl-2,5,8,9-tetraaza-1-phosphabicyclo[3.3.3]undecane, 1-tert-butyl-2,2,4,4,4-pentakis(dimethylamino)-2$\lambda^5$, 4$\lambda^5$-catenadi(phosphazene), 1-tert-butyl-4,4,4-tris(dimethylamino)-2,2-bis[tris(dimethylamino)-phosphoranylideneamino]-2$\lambda^5$, 4$\lambda^5$-catenadi(phosphazene), tris(2,4,6-trimethoxyphenyl)phosphine, tris-(pentafluorophenyl)borane, triethylsilyl trifluoromethanesulfonate, triphenylcarbenium tetrakis-(pentafluorophenyl)borate, trifluoromethanesulfonimide and 1-[bis(trifluoromethanesulfonyl)methyl]-2,3,4,5,6-pentafluorobenzene.

As the reaction terminator, a compound which can donate a proton is used. For example, there may be mentioned methanol, isopropyl alcohol, n-butyl alcohol and water.

The polymer crosslinking agent of the present invention becomes a high molecular weight polymer by subjecting to addition polymerization with an organohydrogen polysiloxane represented by the following general formula (4), and the high molecular weight polymer is a material which can swell by containing the same mass or more as its own mass of liquid oil.

$$M_xD_yT_zQ_w \quad (4)$$

$M=R^8{}_3SiO_{1/2}$
$D=R^9{}_2SiO_{2/2}$
$T=R^9SiO_{3/2}$
$Q=SiO_{4/2}$ $R^8$ and $R^9$ each independently represent a hydrogen atom, a substituted or unsubstituted alkyl group having 1 to 10 carbon atoms or an aryl group having 6 to 22 carbon atoms, and at least two siloxane units contain hydrogen atoms. $R^8$ and $R^9$ each independently and preferably represent a hydrogen atom, an alkyl group having 1 to 4 carbon atoms or an aryl group having 6 to 12 carbon atoms, more preferably a hydrogen atom, a methyl group or a phenyl group. When $R^8$ and $R^9$ are such functional groups, the obtainable high molecular weight polymer becomes a material improved in affinity for ester oil.

"x", "y", "z" and "w" each are 0 or a positive number, provided that y+z+w≥1. "z" and "w" are each preferably 10 or less, and further preferably 0. When "z" and "w" are within the above-mentioned ranges, the above-mentioned organohydrogen polysiloxane becomes linear with less branches, and when it is reacted with the polymer crosslinking agent, it becomes a more uniform high molecular weight polymer.

A number average molecular weight of the organohydrogen polysiloxane represented by the above-mentioned general formula (4) is 500 to 900,000 g/mol, preferably 500 to 100,000 g/mol, and more preferably 500 to 50,000 g/mol. When it is within the above-mentioned range, affinity of the obtainable high molecular weight polymer for ester oil is good. An order of bonding of each siloxane unit represented by the above-mentioned M, D, T and Q is not limited.

For obtaining the high molecular weight polymer of the present invention, the above-mentioned polymer crosslinking agent and the organohydrogen polysiloxane are reacted in the presence of a platinum compound (for example, chloroplatinic acid, alcohol-modified chloroplatinic acid, chloroplatinic acid-vinyl siloxane complex, etc.), or a rhodium compound, at room temperature or under heating (about 50 to 120° C.). At the time of the reaction, it may be carried out without a solvent, or an organic solvent may be used, if necessary. Such an organic solvent may be mentioned, for example, an aliphatic alcohol such as methanol, ethanol, 2-propanol, butanol, etc.; an aromatic hydrocarbon such as benzene, toluene, xylene, etc.; an aliphatic or alicyclic hydrocarbon such as n-pentane, n-hexane, cyclohexane, etc.; a halogenated hydrocarbon such as dichloromethane, chloroform, carbon tetrachloride, etc.; a ketone-based solvent such as acetone, methyl ethyl ketone, etc.; a silicone oil such as decamethylcyclopentasiloxane, etc.; ester oil such as glyceryl triisooctanoate (triethylhexanoin), neopentyl glycol diethylhexanoate, isopropyl myristate, etc. When it is assumed that the obtained high molecular weight polymer is swollen into ester oil, it is preferably carried out without a solvent, or ester oil is used as a solvent.

In order to obtain the composition of the present invention, it can be obtained firstly by synthesizing the above-mentioned the high molecular weight polymer alone and then purifying the same, then, a liquid oil agent is mixed therewith and the mixture is mixed and kneaded. In addition, it can be also obtained by subjecting the high molecular weight polymer which still contains the organic solvent used for the reaction to a purification treatment, then, removing the solvent and volatile components such as odorous components, etc., and mixing a liquid oil agent and mixing and kneading the resulting mixture. Also, after mixing the high molecular weight polymer with the liquid oil agent, the purification treatment may be carried out.

The above-mentioned purification treatment is carried out depending on necessity. For example, it is preferably carried out by adding an acidic substance selected from an organic acid or an inorganic acid and a salt thereof, or water. Although it is possible to carry out the treatment with water alone without adding the acidic substance, it is preferable to carry out the treatment by adding the acidic substance to control the reaction in a constant level. Also, an amount of the acidic substance to be added at this time is preferably 0.01 to 10 parts by mass based on 100 parts by mass of the high molecular weight polymer, and more preferably 0.02 to 5 parts by mass. If it is within the above-mentioned range, the deodorizing effect is high, and the neutralized salt does not precipitate in the composition after the purification treatment. Also, these organic acids may be added as such, and it is preferably added as a 1 to 50% by mass aqueous solution. However, even if an aqueous organic acid solution is added to a high molecular weight polymer containing no liquid oil agent, contacting efficiency with a treatment liquid is low, so that it becomes difficult to increase a degree of purification and to carry out the neutralization reaction. The purification treatment is preferably carried out by preferably adding 5 to 30 parts by mass of an aqueous solution based on 100 parts by mass of the high molecular weight polymer from the viewpoint of contacting efficiency. A pH of the aqueous solution of the acidic substance is preferably set to be 2 to 5, but if the pH is too low, there is a possibility of causing unfavorable reaction such as cleavage of the siloxane chain, etc., so that a more preferable pH is 3 to 5.

As the treatment condition after the addition of the acidic substance, the reaction may be carried out without heating, but it is preferable to heat the mixture to 20 to 150° C., and particularly preferably to 50 to 100° C. After addition of the acidic substance, it is preferable to neutralize the resulting mixture with a basic neutralizing agent, and the basic neutralizing agent may be added as it is, but it is preferable to add it as 1 to 50% by mass of an aqueous solution. Also, an amount thereof to be added is such an amount that the functional group equivalent of the above-mentioned acidic substance and the basic neutralizing agent becomes preferably 1/0.1 to 0.1/1, more preferably 1/0.3 to 0.3/1, and a pH after neutralization is preferably adjusted to be a pH of 5 to 8.

After addition of the basic neutralizing agent, it is preferable to carry out a heat treatment at 20 to 150° C., and more preferable to carry out a heat treatment at 20 to 80° C.

Specific examples of the acidic substance may be mentioned citric acid, lactic acid, tartaric acid, malic acid, glutamic acid, acetic acid, glycine, potassium dihydrogen phosphate, succinic acid, etc., and particularly preferably citric acid, lactic acid and glutamic acid. Specific examples of the basic neutralizing agent may be mentioned sodium carbonate, sodium hydrogen carbonate, sodium hydroxide, potassium hydroxide, disodium hydrogen phosphate, sodium acetate, etc., and particularly preferably sodium carbonate, sodium hydrogen carbonate, sodium hydroxide.

These acidic substances and basic neutralizing agents are preferably selected from a combination in which a salt formed by neutralization has an effect as a buffering agent of a pH, and by employing such a constitution, it is possible not only to reduce odor of the high molecular weight polymer but also to obtain the pH stabilization effect of the composition.

Also, the high molecular weight polymer of the present invention can contain an amount equal to or more than its own weight of a liquid oil agent and can swell, and confirmation thereof is carried out as follows. The high molecular weight polymer and a liquid oil agent are mixed in the same mass and the mixture is left to stand at room temperature. The sample after left to stand is placed on a net having a 100 mesh, and it is to confirm that no separation of the liquid oil agent is observed (the sample passes through the net) even after left to stand for 5 minutes.

For producing the composition of the present invention, mixing and kneading of the high molecular weight polymer and the liquid oil agent may be carried out by a usual stirring machine, and it is preferably mixed and kneaded under a shearing force. This is because the high molecular weight polymer has a three-dimensional crosslinked structure that does not dissolve in a solvent, so by providing sufficient dispersibility to the high molecular weight polymer and the liquid oil agent, a composition having a smooth appearance can be obtained.

The mixing and kneading treatment can be carried out, for example, by a three-roll mill, a two-roll mill, a side grinder, a colloid mill, a Gaulin homogenizer, a disper, etc., and a method by a three-roll or a disper is preferable.

As the liquid oil agent to be used in the present invention, those which show fluidity at 25° C. can be suitably used. From the viewpoint of usability, a liquid oil having a kinematic viscosity at 25° C. of 1 to 10,000 mm$^2$/sec is preferably used. Such a liquid oil agent may be mentioned silicone oil, hydrocarbon oil, ester oil, higher fatty acid, natural animal or vegetable oil, semi-synthetic oil, etc.

As the silicone oil, there may be mentioned an organopolysiloxane which is a liquid state at normal temperature from a low viscosity to a high viscosity such as dimethylpolysiloxane, methylphenylpolysiloxane, methylhydrogen polysiloxane, a dimethylsiloxane methyl-phenylsiloxane copolymer, etc., a cyclic siloxane such as octamethylcyclotetrasiloxane (D4), decamethylcyclopentasiloxane (D5), dodecamethylcyclohexasiloxane (D6), tetramethyltetrahydrogen cyclotetrasiloxane (H4), tetramethyltetraphenylcyclotetrasiloxane, etc., a branched siloxane such as tristrimethylsiloxysilane (M3T), tetrakistrimethylsiloxysilane (M4Q), tristrimethylsiloxyphenylsilane, etc., a higher alkoxy-modified silicone such as stearoxysilicone, etc., an alkyl-modified silicone, an amino-modified silicone, a fluorine-modified silicone, etc.

As the hydrocarbon oil, there may be mentioned chain and cyclic hydrocarbon oils. Specifically, from the viewpoint of usability, α-olefin oligomer, light isoparaffin, light liquid isoparaffin, squalane, synthetic squalane, vegetable squalane, squalene, liquid paraffin, liquid isoparaffin, etc., are preferable. Also, there may be mentioned a material which is solid at normal temperature such as ceresin, vaseline, etc.

As the ester oil, there may be mentioned diisobutyl adipate, 2-hexyldecyl adipate, di-2-heptylundecyl adipate, N-alkyl glycol monoisostearate, isocetyl isostearate, trimethylolpropane triisostearate, ethylene glycol di-2-ethylhexanoate, neopentyl glycol diethylhexanoate, cetyl 2-ethylhexanoate, trimethylolpropane tri-2-ethylhexanoate, pentaerythritol tetra-2-ethylhexanoate, cetyl octanoate, octyldodecyl gum ester, oleyl oleate, octyldodecyl oleate, decyl oleate, neopentyl glycol dioctanoate, neopentyl glycol dicaprate, triethyl citrate, 2-ethylhexyl succinate, amyl acetate, ethyl acetate, butyl acetate, isocetyl stearate, butyl stearate, diisopropyl sebacate, di-2-ethylhexyl sebacate, cetyl lactate, myristyl lactate, isononyl isononanate, isotridecyl isononanate, isopropyl palmitate, 2-ethylhexyl palmitate, 2-hexyldecyl palmitate, 2-heptylundecyl palmitate, cholesteryl 12-hydroxystearate, dipentaerythritol fatty acid ester, isopropyl myristate, octyldodecyl myristate, 2-hexyldecyl myristate, myristyl myristate, hexyldecyl dimethyloctanoate, ethyl laurate, hexyl laurate, N-lauroyl-L-glutamic acid-2-octyldodecyl ester, diisostearyl malate, etc.

Also, among the ester oils, those that fall within the category of glyceride oil may be mentioned acetoglyceryl, glyceryl triisooctanoate (triethylhexanoin), glyceryl triisostearate, glyceryl triisopalmitate, glyceryl monostearate, glyceryl di-2-heptylundecanoate, glyceryl trimyristate, diglyceryl isostearate myristate, etc.

As the higher fatty acid, there may be mentioned undecylenic acid, oleic acid, linoleic acid, linolenic acid, arachidonic acid, eicosapentaenoic acid (EPA), docosahexaenoic acid (DHA), isostearic acid, lactic acid, etc., and as the higher alcohol, there may be mentioned oleyl alcohol, isostearyl alcohol, hexyldecanol, octyldodecanol, cetostearyl alcohol, 2-decyltetradecinol, monooleyl glyceryl ether (ceracyl alcohol), etc.

Also, as the natural animal or vegetable oil agent and semi-synthetic oil agent, there may be mentioned avocado oil, almond oil, olive oil, liver oil, beef leg oil, apricot kernel oil, wheat germ oil, sesame oil, rice germ oil, rice bran oil, Camellia sasanqua oil, safflower oil, cinnamon oil, squalane, squalene, turtle oil, soybean oil, teaseed oil, camellia oil, evening primrose oil, corn oil, rapeseed oil, Japanese Tung oil, germ oil, persic oil, castor oil, castor oil fatty acid methyl ester, sunflower oil, grape oil, jojoba oil, macadamia nut oil, mink oil, meadowfoam oil, cottonseed oil, coconut fatty acid triglyceride, peanut oil, liquid lanolin, acetylated lanolin alcohol, lanolin fatty acid polyethylene glycol, egg yolk oil, etc.

With regard to the embodiment of the composition of the present invention, it is not particularly limited, and it can be made a liquid state, an emulsion state, a cream state, a solid state, a paste state, a gel state, a powder state, a multilayer state, a mousse state, a spray state, etc., and particularly preferably a paste state.

Also, when the composition of the present invention is a paste state, it is preferable that a mixing consistency at 25° C. of 300 to 600, particularly about 330 to 470. Here, the mixing consistency can be measured in accordance with JIS K2220.

EXAMPLE

Hereinafter, the present invention will be specifically described by showing Examples and Comparative Examples, but the present invention is not limited to the following Examples.

Unless otherwise specifically mentioned, "%" described below means "% by mass", and represents % by mass of each component based on the total mass of each example as 100%. The viscosity is a value measured by a B type rotational viscometer at 25° C. For GPC, HLC-8220 GPC (manufactured by Tosoh Corporation) was used. For NMR, AVANCE III 400 (manufactured by Bruker Corporation) was used.

Synthesis of Polymer Crosslinking Agent

Example 1

Figure 1:
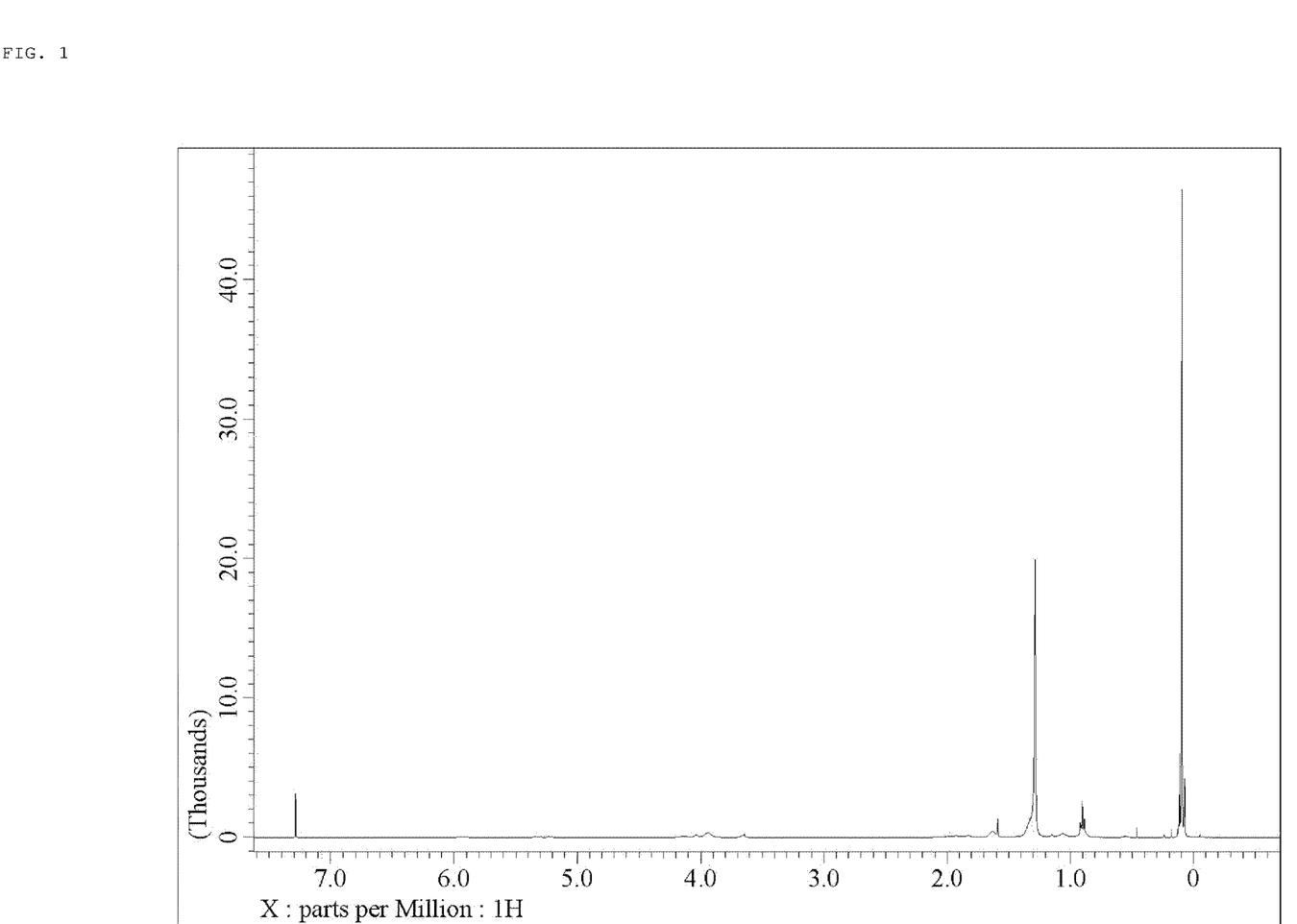
FIG. 1 is a $^1$H-NMR chart (general view) of the polymer crosslinking agent produced in Example 1.
Figure 2:
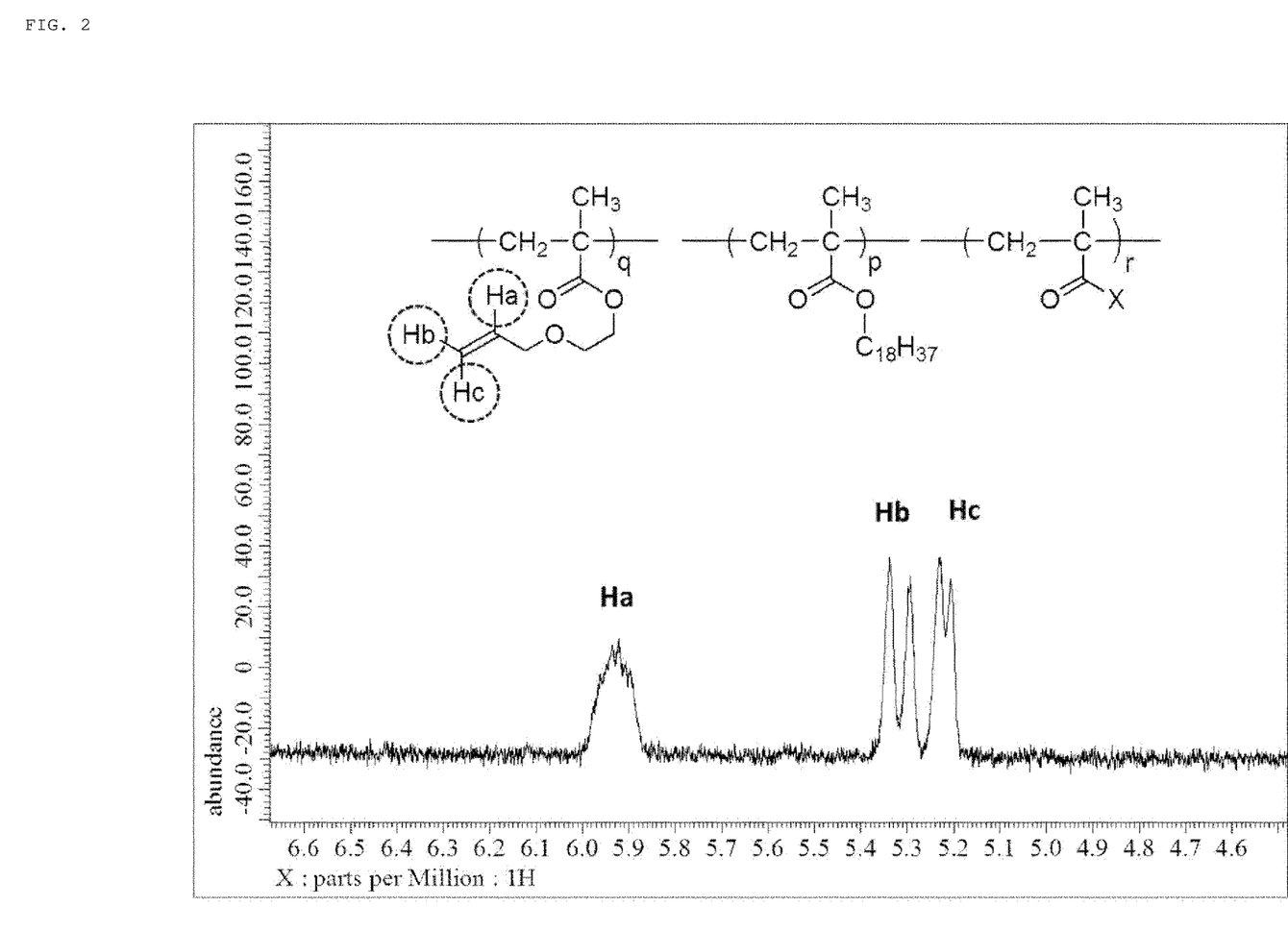
FIG. 2 is an (enlarged view) of $^1$H-NMR chart of the copolymer produced in Example 1.

In a three-necked flask was charged 100 mg of tetrabutylammonium m-chlorobenzoate dried under reduced pressure, and 125 mL of THF was added thereto to dissolve the material. Under nitrogen atmosphere, 2.18 g of dimethylketene methyl trimethylsilyl acetal was added to the mixture, and a monomer mixture (50 g of stearyl methacrylate (SMA), 6.5 g of 2-allyloxyethyl methacrylate and 50 g of a monomer (a) represented by the following formula) was added dropwise thereto over 30 minutes. The mixture was further stirred at room temperature for 1 hour, 100 mL of toluene was added and the mixture was washed with water three times. The organic phase was separated and dried over sodium sulfate. After filtration, the solvent was removed under reduced pressure at 125° C. for 1 hour to obtain an objective polymer crosslinking agent. From the $^1$H-NMR spectrum, it was confirmed to be the structure represented by the following formula (8) having an unsaturated bonding at the side chain. FIG. 1 is a general view of the $^1$H-NMR chart, and FIG. 2 is a view in which the portion showing the structure of the unsaturated bond at the side chain of the $^1$H-NMR chart is enlarged. Also, the number average molecular weight and the polydispersity (Mw/Mn, which is also called to as a molecular distribution.) (in terms of polystyrene) were measured by GPC. The number average molecular weight (Mn) was 12,350 (g/mol), and the polydispersity (Mw/Mn) was 1.31.

Monomer (a)

(8)

(in the formula (8), X represents a residue of the above-mentioned monomer (a), "p", "q" and "r" are such numbers that the polymer crosslinking agent has the above-mentioned number average molecular weight, and each unit shown in the parentheses is randomly bonded)

Example 2

In a three-necked flask was charged 100 mg of tetrabutylammonium m-chlorobenzoate dried under reduced pressure, and 125 mL of THF was added thereto to dissolve the material. Under nitrogen atmosphere, 2.18 g of dimethylketene methyl trimethylsilyl acetal was added to the mixture, and a monomer mixture (50 g of dodecyl methacrylate (DMA), 6.5 g of 2-allyloxyethyl methacrylate and 50 g of the monomer (a) represented by the above-mentioned formula) was added dropwise thereto over 30 minutes. The mixture was further stirred at room temperature for 1 hour, 100 mL of toluene was added and the mixture was washed with water three times. The organic phase was separated and dried over sodium sulfate. After filtration, the solvent was removed under reduced pressure at 125° C. for 1 hour to obtain an objective polymer crosslinking agent. From the $^1$H-NMR spectrum, it was confirmed to be the structure represented by the following formula (9) having an unsaturated bonding at the side chain. Also, when the number average molecular weight and the polydispersity (Mw/Mn) (in terms of polystyrene) were measured by GPC, the number average molecular weight (Mn) was 12,030, and the polydispersity (Mw/Mn) was 1.28.

(9)

(in the formula (9), X represents a residue of the above-mentioned monomer (a), "p", "q" and "r" are such numbers that the copolymer has the above-mentioned number average molecular weight, and each unit shown in the parentheses is randomly bonded)

Example 3

In a three-necked flask was charged 100 mg of tetrabutylammonium m-chlorobenzoate dried under reduced pressure, and 125 mL of THF was added thereto to dissolve the material. Under nitrogen atmosphere, 2.18 g of dimethylketene methyl trimethylsilyl acetal was added to the mixture, and a monomer mixture (50 g of butyl methacrylate (BMA), 6.5 g of 2-allyloxyethyl methacrylate and 50 g of the monomer (a) represented by the above-mentioned formula) was added dropwise thereto over 30 minutes. The mixture was further stirred at room temperature for 1 hour, 100 mL of toluene was added and the mixture was washed with water three times. The organic phase was separated and dried over sodium sulfate. After filtration, the solvent was removed under reduced pressure at 125° C. for 1 hour to obtain an objective polymer crosslinking agent. From the $^1$H-NMR spectrum, it was confirmed to be the structure represented by the following formula (10) having an unsaturated bonding at the side chain. Also, when the number average molecular weight and the polydispersity (Mw/Mn) (in terms of polystyrene) were measured by GPC, the number average molecular weight (Mn) was 12,460 and the polydispersity (Mw/Mn) was 1.37.

(10)

-continued (in the formula (10), X represents a residue of the above-mentioned monomer (a), "p", "q" and "r" are such numbers that the copolymer has the above-mentioned number average molecular weight, and each unit shown in the parentheses is randomly bonded)

Example 4

In a three-necked flask was charged 100 mg of tetrabutylammonium m-chlorobenzoate dried under reduced pressure, and 125 mL of THF was added thereto to dissolve the material. Under nitrogen atmosphere, 2.18 g of dimethylketene methyl trimethylsilyl acetal was added to the mixture, and a monomer mixture (50 g of methyl methacrylate (MMA), 6.5 g of 2-allyloxyethyl methacrylate and 50 g of the monomer (a) represented by the above-mentioned formula) was added dropwise thereto over 30 minutes. The mixture was further stirred at room temperature for 1 hour, 100 mL of toluene was added and the mixture was washed with water three times. The organic phase was separated and dried over sodium sulfate. After filtration, the solvent was removed under reduced pressure at 125° C. for 1 hour to obtain an objective polymer crosslinking agent. From the $^1$H-NMR spectrum, it was confirmed to be the structure represented by the following formula (11) having an unsaturated bonding at the side chain. Also, the number average molecular weight and the polydispersity (Mw/Mn) (in terms of polystyrene) were measured by GPC. The number average molecular weight (Mn) was 10,570, and the polydispersity (Mw/Mn) was 1.55.

(11)

(in the formula (11), X represents a residue of the above-mentioned monomer (a), "p", "q" and "r" are such numbers that the copolymer has the above-mentioned number average molecular weight, and each unit shown in the parentheses is randomly bonded)

Example 5

In a three-necked flask was charged 100 mg of tetrabutylammonium m-chlorobenzoate dried under reduced pressure, and 125 mL of THF was added thereto to dissolve the material. Under nitrogen atmosphere, 2.18 g of dimethylketene methyl trimethylsilyl acetal was added to the mixture, and a monomer mixture (25 g of stearyl methacrylate (SMA), 6.5 g of 2-allyloxyethyl methacrylate and 25 g of the monomer (a) represented by the above-mentioned formula) was added dropwise thereto over 30 minutes. The mixture was further stirred at room temperature for 1 hour, 100 mL of toluene was added and the mixture was washed with water three times. The organic phase was separated and dried over sodium sulfate. After filtration, the solvent was removed under reduced pressure at 125° C. for 1 hour to obtain an objective polymer crosslinking agent. From the $^1$H-NMR spectrum, it was confirmed to be the structure represented by the following formula (8) having an unsaturated bonding at the side chain. Also, when the number average molecular weight and the polydispersity (Mw/Mn) (in terms of polystyrene) were measured by GPC, the number average molecular weight (Mn) was 7,070 and the polydispersity (Mw/Mn) was 1.28.

Example 6

In a three-necked flask was charged 100 mg of tetrabutylammonium m-chlorobenzoate dried under reduced pressure, and 125 mL of THF was added thereto to dissolve the material. Under nitrogen atmosphere, 2.18 g of dimethylketene methyl trimethylsilyl acetal was added to the mixture, and a monomer mixture (75 g of stearyl methacrylate (SMA), 6.5 g of 2-allyloxyethyl methacrylate and 75 g of the monomer (a) represented by the above-mentioned formula) was added dropwise thereto over 30 minutes. The mixture was further stirred at room temperature for 1 hour, 100 mL of toluene was added and the mixture was washed with water three times. The organic phase was separated and dried over sodium sulfate. After filtration, the solvent was removed under reduced pressure at 125° C. for 1 hour to obtain an objective polymer crosslinking agent. From the $^1$H-NMR spectrum, it was confirmed to be the structure represented by the following formula (8) having an unsaturated bonding at the side chain. Also, the number average molecular weight and the polydispersity (Mw/Mn) (in terms of polystyrene) were measured by GPC. The number average molecular weight (Mn) was 20,030, and the polydispersity (Mw/Mn) was 1.55.

Example 7

In a three-necked flask was charged 19.9 mg of tetrabutylammonium m-chlorobenzoate dried under reduced pressure, and 25 mL of THF was added thereto to dissolve the material. Under nitrogen atmosphere, 436 mg of dimethylketene methyl trimethylsilyl acetal was added to the mixture, and a monomer mixture (10 g of methyl methacrylate (MMA), 0.9 g of allyl methacrylate and 10 g of the monomer (a) represented by the above-mentioned formula) was added dropwise thereto over 30 minutes. The mixture was further stirred at room temperature for 1 hour, 100 mL of toluene was added and the mixture was washed with water three times. The organic phase was separated and dried over sodium sulfate. After filtration, the solvent was removed under reduced pressure at 125° C. for 1 hour to obtain an objective polymer crosslinking agent. From the $^1$H-NMR spectrum, it was confirmed to be the structure represented by the following formula (12) having an unsaturated bonding at the side chain. Also, when the number average molecular weight and the polydispersity (Mw/Mn) (in terms of polystyrene) were measured by GPC, the number average molecular weight (Mn) was 13,100, and the polydispersity (Mw/Mn) was 2.37.

(12)

(in the formula (12), X represents a residue of the above-mentioned monomer (a), "p", "q" and "r" are such numbers that the copolymer has the above-mentioned number average molecular weight, and each unit shown in the parentheses is randomly bonded)

Synthesis of High Molecular Weight Polymer

Example 8

In a reactor were mixed 3.29 g of organohydrogen polysiloxane represented by an average compositional formula of $M^H{}_2D_{40}$ (in the above-mentioned general formula (4), a material in which one or more of $R^8$s is/are a hydrogen atom(s), and the number average molecular weight is 3,100), 6.71 g of the polymer crosslinking agent described in Example 1 and 23 g of decamethylcyclopentasiloxane, and 10 mg of an ethanol solution containing 3% by mass chloroplatinic acid was added to the mixture and the resulting mixture was stirred at 80° C. for 1 hour to obtain a high molecular weight polymer.

Example 9

In a reactor were mixed 2.96 g of organohydrogen polysiloxane represented by an average compositional formula of $M^H{}_2D_{40}$ (in the above-mentioned general formula (4), a material in which one or more of $R^8$s is/are a hydrogen atom(s), the number average molecular weight is 3,100), 7.04 g of the polymer crosslinking agent described in Example 2 and 23 g of decamethylcyclopentasiloxane, and 10 mg of an ethanol solution containing 3% by mass chloroplatinic acid was added to the mixture and the resulting mixture was stirred at 80° C. for 1 hour to obtain a high molecular weight polymer.

Example 10

In a reactor were mixed 3.08 g of organohydrogen polysiloxane represented by an average compositional formula of $M^H{}_2D_{40}$ (in the above-mentioned general formula (4), a material in which one or more of $R^8$s is/are a hydrogen atom(s), and the number average molecular weight is 3,100), 6.92 g of the polymer crosslinking agent described in Example 3 and 23 g of decamethylcyclopentasiloxane, and 10 mg of an ethanol solution containing 3% by mass chloroplatinic acid was added to the mixture and the resulting mixture was stirred at 80° C. for 1 hour to obtain a high molecular weight polymer.

Example 11

In a reactor were mixed 2.91 g of organohydrogen polysiloxane represented by an average compositional formula of $M^H{}_2D_{40}$ (in the above-mentioned general formula (4), a material in which one or more of $R^8$s is/are a hydrogen atom(s), and the number average molecular weight is 3,100), 7.09 g of the polymer crosslinking agent described in Example 4 and 23 g of decamethylcyclopentasiloxane, and 10 mg of an ethanol solution containing 3% by mass chloroplatinic acid was added to the mixture and the resulting mixture was stirred at 80° C. for 1 hour to obtain a high molecular weight polymer.

Example 12

In a reactor were mixed 3.29 g of organohydrogen polysiloxane represented by an average compositional formula of $M^H{}_2D_{40}$ (in the above-mentioned general formula (4), a material in which one or more of $R^8$s is/are a hydrogen atom(s), and the number average molecular weight is 3,100), 6.71 g of the polymer crosslinking agent described in Example 1 and 23 g of triethylhexanoin, and 10 mg of an ethanol solution containing 3% by mass chloroplatinic acid was added to the mixture and the resulting mixture was stirred at 80° C. for 1 hour to obtain a high molecular weight polymer.

Example 13

In a reactor were mixed 3.29 g of organohydrogen polysiloxane represented by an average compositional formula of $M^H{}_2D_{40}$ (in the above-mentioned general formula (4), a material in which one or more of $R^8$s is/are a hydrogen atom(s), and the number average molecular weight is 3,100), 6.71 g of the polymer crosslinking agent described in Example 1 and 23 g of neopentyl glycol diethylhexanoate, and 10 mg of an ethanol solution containing 3% by mass chloroplatinic acid was added to the mixture and the resulting mixture was stirred at 80° C. for 1 hour to obtain a high molecular weight polymer.

Example 14

In a reactor were mixed 3.29 g of organohydrogen polysiloxane represented by an average compositional formula of $M^H{}_2D_{40}$ (in the above-mentioned general formula (4), a material in which one or more of $R^8$s is/are a hydrogen atom(s), and the number average molecular weight is 3,100), 6.71 g of the polymer crosslinking agent described in Example 1 and 23 g of isopropyl myristate, and 10 mg of an ethanol solution containing 3% by mass chloroplatinic acid was added to the mixture and the resulting mixture was stirred at 80° C. for 1 hour to obtain a high molecular weight polymer.

Example 15

In a reactor were mixed 3.53 g of an organohydrogen polysiloxane represented by an average compositional formula of $M^H{}_2D_{133}$ (in the above-mentioned general formula (4), a material in which one or more of $R^8$s is/are a hydrogen atom(s), and the number average molecular weight is 9,996), 6.46 g of the polymer crosslinking agent described in Example 1 and 23 g of decamethylcyclopentasiloxane, and 10 mg of an ethanol solution containing 3% by mass chloroplatinic acid was added to the mixture and the resulting mixture was stirred at 80° C. for 1 hour to obtain a high molecular weight polymer.

Production of Composition

Example 16

The high molecular weight polymer described in Example 8 was mixed and kneaded with a three-roll mixer, then, decamethylcyclopentasiloxane was added to the mixture to dilute the same to obtain a paste-state composition containing 10% of the high molecular weight polymer. This composition had a mixing consistency of 415 and a refractive index of 1.400.

Example 17

The high molecular weight polymer described in Example 9 was mixed and kneaded with a three-roll mixer, then, decamethylcyclopentasiloxane was added to the mixture to dilute the same to obtain a paste-state composition containing 10% of the high molecular weight polymer. This composition had a mixing consistency of 415 and a refractive index of 1.400.

Example 18

The high molecular weight polymer described in Example 10 was mixed and kneaded with a three-roll mixer, then, decamethylcyclopentasiloxane was added to the mixture to dilute the same to obtain a paste-state composition containing 10% of the high molecular weight polymer. This composition had a mixing consistency of 447 and a refractive index of 1.400.

Example 19

The high molecular weight polymer described in Example 12 was mixed and kneaded with a three-roll mixer, then, triethylhexanoin was added to the mixture to dilute the same to obtain a paste-state composition containing 10% of the high molecular weight polymer. This composition had a mixing consistency of 401 and a refractive index of 1.443.

Example 20

The high molecular weight polymer described in Example 13 was mixed and kneaded with a three-roll mixer, then, neopentyl glycol diethylhexanoate was added to the mixture to dilute the same to obtain a paste-state composition containing 10% of the high molecular weight polymer. This composition had a mixing consistency of 343 and a refractive index of 1.437.

Example 21

The high molecular weight polymer described in Example 14 was mixed and kneaded with a three-roll mixer, then, isopropyl myristate was added to the mixture to dilute the same to obtain a paste-state composition containing 10% of the high molecular weight polymer. This composition had a mixing consistency of 353 and a refractive index of 1.433.

Affinity Evaluation with Triethylhexanoin

Each 10 g of the paste-state compositions of Examples 16, 17 and 18, paste-state compositions of organopolysiloxane polymerized products (in Comparative Example 1, 10% of (dimethicone/vinyl dimethicone) crosspolymer and 90% of decamethylcyclopentasiloxane, in Comparative Example 2, 10% of (dimethicone/(PEG-10/15)) crosspolymer and 90% of decamethylcyclopentasiloxane, and in Comparative Example 3, 10% of (lauryl polydimethylsiloxyethyl dimethicone/bisvinyl dimethicone) crosspolymer and 90% of decamethylcyclopentasiloxane) was mixed with 20 g of triethylhexanoin, and the mixture was stirred using a dipser at 1,000 rpm for 10 minutes. Appearance of the respective materials are shown in Table 1. Whereas the compositions of the present invention became transparent appearance, appearance of Comparative Examples was turbid. From these results, it was found that the compositions of the present invention was improved in affinity for ester oil.

TABLE 1

| | Example 16 | Example 17 | Example 18 | Comparative Example 1 | Comparative Example 2 | Comparative Example 3 |
|---|---|---|---|---|---|---|
| Appearance after mixing | Transparent | Transparent | Transparent | Turbid | Turbid | Turbid |

INDUSTRIAL APPLICABILITY

The polymer crosslinking agent, the high molecular weight polymer, and the composition thereof of the present invention can be used as a material for cosmetics, and can be swollen by using not only silicone oil but also various ester oils, so that it can be used for wide ranges of cosmetic compositions.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

The invention claimed is:

1. A polymer crosslinking agent which comprises a (meth) acrylic-based graft silicone which has a main chain having (meth)acrylic-based repeating units represented by the following formulae (I), (II) and (III), and a side chain having an unsaturated bond(s) and an organopolysiloxane structure:

(I)

(II)

(III)

wherein, $R^1$s each independently represent a hydrogen atom or a methyl group,

A represents an alkoxy group having 1 to 22 carbon atoms, an aryloxy group having 6 to 20 carbon atoms, a substituted or unsubstituted monovalent hydrocarbon group having 1 to 20 carbon atoms which may contain one or more kinds selected from —O—, —S— and —NR—, where R represents a hydrogen atom or a monovalent hydrocarbon group having 1 to 20 carbon atoms, provided that the oxygen atom, the sulfur atom and the nitrogen atom are not adjacent to each other, an amino group, a dialkylsiloxy group, a halogen atom or a hydroxyl group;

B is a 2-allyloxyethoxy group;

(1)

C represents any of a group having a linear organopolysiloxane structure represented by the following formula (2), or a group having a dendritic organopolysiloxane structure represented by the following formula (3-1) or (3-2):

(2)

in the formula (2), $Z_1$ represents a divalent organic group, $R^3$ s each independently represents a saturated hydrocarbon group having 1 to 10 carbon atoms or a phenyl group, $R^4$ represents a saturated hydrocarbon group having 1 to 10 carbon atoms, and "m" is an integer of 0 to 100;

(3-1)

(3-2)

in the formulae (3-1) and (3-2), $Z_2$ represents a divalent organic group, "a" is a number of 0 to 3, Q represents a group represented by the following formula (3), D represents an organopolysiloxanyl group having a dendritic structure with a hierarchical number of "c" and a valence of $3^c+1$, that is, "3 to the $c^{th}$ power"+1, "c" is an integer of 1 to 8, (3)

$R^5$ represents a saturated hydrocarbon group having 1 to 10 carbon atoms or a phenyl group; $R^6$ represents a saturated hydrocarbon group having 1 to 8 carbon atoms or a phenyl group; $R^7$ represents a hydrogen atom, a saturated hydrocarbon group having 1 to 10 carbon atoms or a phenyl group, $a^2$ is a real number of 0 to 2, and "n" is an integer of 2 to 12;

an order of bonding of the repeating units represented by the formulae (I), (II) and (III) is not limited, "p", "q" and "r" are integers, "q" and "r" are not 0, and are numbers in which a number average molecular weight of the polymer crosslinking agent is 1,000 to 1,000,000 g/mol.

2. A high molecular weight polymer which comprises an addition polymerization product of the polymer crosslinking agent according to claim 1 and an organohydrogen polysiloxane represented by the following general formula (4):

$$M_xD_yT_zQ_w \quad (4)$$

$M=R^8_3SiO_{1/2}$
$D=R^9_2SiO_{2/2}$
$T=R^9SiO_{3/2}$
$Q=Si_{4/2}$ wherein, $R^8$ and $R^9$ each independently represent a hydrogen atom, a substituted or unsubstituted alkyl group having 1 to 10 carbon atoms or an aryl group having 6 to 20 carbon atoms, and at least two siloxane units contain hydrogen atoms; "x", "y", "z" and "w" each are 0 or a positive number, provided that y+z+w≥1, and are numbers in which a number average molecular weight of the organohydrogen polysiloxane represented by the general formula (4) is 500 to 900,000 g/mol; an order of bonding of each siloxane unit represented by the above-mentioned M, D, T and Q is not limited.

3. The high molecular weight polymer according to claim 2, which is a material which can swell by containing liquid oil with the same mass or more as its own mass.

4. A composition which comprises the high molecular weight polymer according to claim 3, the high molecular weight polymer being swollen by a liquid oil agent.

5. The high molecular weight polymer according to claim 3, wherein $R^9$ is a methyl group or a phenyl group, and "z" and "w" are 0 in the organohydrogen polysiloxane.

6. A composition which comprises the high molecular weight polymer according to claim 5, the high molecular weight polymer being swollen by a liquid oil agent.

7. The high molecular weight polymer according to claim 2, wherein $R^9$ is a methyl group or a phenyl group, and "z" and "w" are 0 in the organohydrogen polysiloxane.

8. A composition which comprises the high molecular weight polymer according to claim 7, the high molecular weight polymer being swollen by a liquid oil agent.

9. A composition which comprises the high molecular weight polymer according to claim 2, the high molecular weight polymer being swollen by a liquid oil agent.

10. The composition according to claim 9, wherein the liquid oil agent is at least one oil agent selected from the group consisting of silicone oil, hydrocarbon oil, ester oil, natural animal oil, natural vegetable oil, and semi-synthetic oil.

* * * * *